(12) United States Patent  
Campbell et al.

(10) Patent No.: US 8,595,201 B2  
(45) Date of Patent: Nov. 26, 2013

(54) VERSION VISUALIZATION

(75) Inventors: Christopher S. Campbell, San Jose, CA (US); Sechan Oh, Stanford, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/282,546

(22) Filed: Oct. 27, 2011

(65) Prior Publication Data

US 2013/0110797 A1 May 2, 2013

(51) Int. Cl.
*G06F 7/00* (2006.01)

(52) U.S. Cl.
USPC ....................................................... 707/695

(58) Field of Classification Search
USPC ....................................................... 707/695
See application file for complete search history.

(56) References Cited

U.S. PATENT DOCUMENTS

| | | | |
|---|---|---|---|
| 5,974,254 A | 10/1999 | Hsu | |
| 7,111,253 B2 | 9/2006 | Newman | |
| 7,725,499 B1 * | 5/2010 | von Lepel et al. | 707/803 |
| 7,788,295 B2 | 8/2010 | Wall et al. | |
| 7,836,028 B1 * | 11/2010 | Agarwal et al. | 707/695 |
| 2007/0239291 A1 * | 10/2007 | Wayland et al. | 700/83 |
| 2009/0019014 A1 * | 1/2009 | Sugimoto | 707/3 |
| 2011/0016099 A1 * | 1/2011 | Peer et al. | 707/695 |
| 2011/0099515 A1 | 4/2011 | Doney et al. | |
| 2011/0320445 A1 * | 12/2011 | Lee et al. | 707/737 |
| 2012/0084257 A1 * | 4/2012 | Bansode et al. | 707/638 |
| 2012/0254900 A1 * | 10/2012 | Kumar et al. | 719/328 |

FOREIGN PATENT DOCUMENTS

WO 00/08575 2/2000

OTHER PUBLICATIONS

Ball et al., Software Visualization in the Large, IEEE Computer, vol. 29, No. 4, Apr. 1996, pp. 1-27.
Wu et al., Visualization of Version Control Information, Thesis, University of Victoria, 2003, 116 pages.
Mladenic et al., Visualizing Very Large Graphs Using Clustering Neighborhoods, Lecture Notes in Computer Science, 2005, v.3539/2005, 9 pages.
Method and System for Determining a Process Facilitator to Facilitate a Process Event, IP.com No. IPCOM000205611D, IP.com Electronic Publication: Mar. 31, 2011, Retrieved from the Internet: < URL: http://priorartdatabase.com/IPCOM/000205611>, 5 pages.

* cited by examiner

*Primary Examiner* — Pierre Vital
*Assistant Examiner* — Christopher J Raab
(74) *Attorney, Agent, or Firm* — Schmeiser, Olsen & Watts

(57) ABSTRACT

An approach for visualizing versions of a hierarchically organized object is presented. A measure of similarity is computed between each version and a standard version. Versions having identical hierarchies are clustered into sets of versions. Versions within each of the sets of versions are organized according to the computed similarity measures. A visualization is generated as a plot having first and second dimensions. The first dimension represents similarity between a set of versions and the standard version. The second dimension represents similarity between a version and the standard version. In one embodiment, the visualization includes, in a first area, information from multiple hierarchical levels of the standard version and includes, in a second area, information from only the root node level of the other versions. After receiving an approval of a version in the second area, the approved version may replace the standard version in the first area.

10 Claims, 11 Drawing Sheets

```
VERSION A                                    11/04/28
     11/05/10
     • Required approvals (none)
     • Completed
         – Rule: S   Date: 11/04/28 By 2
                                         Q    D    $
     • Supply Chain
         – Order entry
             ▪ Accounting sl5           1    36   2.32
             ▪ Clerical sl3             2    36   1.8
         – Approvals
             ▪ Accounting sl8           2    36   18.4
```

*FIG. 4A*

```
                                                                    450
                                                                   /
VERSION C                                           11/05/05
    11/05/10
    • Required approvals
        – Rule: 118        Approvers {2,4,5,6}
    • Completed
        – Rule: S   Date: 11/04/28 By 2
                                        Q    D    $
    • Supply Chain
        – Order entry
            ▪ Accounting sl5            2    36   5.65
            ▪ Clerical sl3              2    36   1.8
        – Approvals
            ▪ Accounting sl8            1    36   9.2
    • Strategy
        – Tech Forecast
            ▪ Futurist sl8              1    12   4.1
```

*FIG. 4B*

VERSION VISUALIZATION

TECHNICAL FIELD

The present invention relates to a data processing method and system for managing versions of an object, and more particularly to a technique for visualizing versions of a hierarchically organized object.

BACKGROUND

The engagement process involves a service provider and a potential service client. The engagement process begins when either the service provider or the potential service client decides to create or request a proposal for services, and continues through to a conclusion of negotiations with a result of a signed contract for the services or a decision not to pursue a contract. The service provider designates a solution preparation team. In current state-of-the-art engagement processes, the solution preparation team considers many potential proposal versions, obtains required service provider approvals for some of the versions, and releases a subset of the approved versions to the potential service client. The number and type of approvals required depends on the stage of the engagement process and on the specific service elements being proposed. Versions may be managed and saved in an ad hoc manner or in a version management system.

BRIEF SUMMARY

First embodiments of the present invention provide a method of visualizing versions of a hierarchically organized object. The object has labeled nodes and numerical parameters and the versions include a unique standard version. The method comprises the steps of:

computing a respective similarity measure between each version and the unique standard version;

clustering versions having identical hierarchies into respective sets of versions;

organizing versions within each of the respective sets of versions according to the computed respective similarity measures; and generating a visualization as a plot having first and second dimensions, wherein the first dimension represents similarity between a set of versions and the unique standard version, and wherein the second dimension represents similarity between a version and the unique standard version.

The aforementioned steps of computing, clustering, organizing and generating are performed by at least one computer.

Second embodiments of the present invention provide a method of visualizing versions of an object organized as a hierarchy having multiple levels including (i) a root node level having a root node and (ii) one or more non-root node levels, where each of the one or more non-root node levels has one or more other nodes. The method comprises the steps of:

generating a first area of a visualization so the first area includes a first version of the object, wherein the first version includes information from the multiple levels of the hierarchy into which the object is organized;

generating a second area of the visualization so the second area includes a plurality of second versions of the object, wherein each second version includes information only from the root node level of the hierarchy;

subsequent to generating the first and second areas, receiving an approval of a second version included in the plurality of second versions; and in response to receiving the approval of the second version, modifying the visualization by automatically replacing, in the first area, the first version with the approved second version and by removing the approved second version from the second area.

The aforementioned steps of generating the first area, generating the second area, receiving, modifying, replacing and removing are performed by at least one computer.

Systems, program products and a processes for supporting computing infrastructure where the process provides at least one support service are also described herein, where the systems, program products and processes for supporting computing infrastructure correspond to the aforementioned methods.

Embodiments of the present invention provide an automated and systematic way to group similar versions of data objects such as documents within a two-dimensional ordering of the versions and compare information in the versions in a side-by-side display. The comparison of information may include a comparison of one level of detail in a first version to a different level of detail in a second version. Embodiments disclosed herein provide a connection between version management and the approvals process. Further, embodiments of the present invention provide a systematic and automated way to view differences and summaries of differences between versions.

BRIEF DESCRIPTION OF THE DRAWINGS

FIG. 4A is an example of a summary tree that represents an approved version of a hierarchically organized object, where the approved version is visualized by the system of FIG. 1, in accordance with embodiments of the present invention.

FIG. 4B is an example of a summary tree that represents a version of a hierarchically organized object, where the version requires approval and is visualized by the system of FIG. 1, in accordance with embodiments of the present invention.

DETAILED DESCRIPTION

Overview

Embodiments of the present invention provide an automated and systematic way to group versions of a hierarchically organized data object based on similarities across two dimensions between the grouped versions and a standard version. Embodiments of the present invention also provide an automated and systematic way to compare information of a standard version at one level of detail to information of one or more other versions at a different level of detail, where the information of the standard version is displayed in one portion (e.g., one side) of a view and the information of the one or more other versions is displayed in another portion (e.g., another side) of the view. Embodiments disclosed herein provide a connection between version management and the approvals process. Further, embodiments of the present invention provide a systematic and automated way to view differences and summaries of differences between versions. The present invention recognizes that known version management systems fail to provide the aforementioned features provided by embodiments disclosed herein.

In one embodiment, a high level visualization of proposal versions is provided to a proposal preparation team in an engagement process that utilizes a standardized catalog of service element offerings that specifies a hierarchical service element structure. The high level visualization may provide, for each version, summary financial data (e.g., projected cost), approval details (e.g., potential approvers, approver who provided approval, and date and time of the approval), projected approval delay time, and a deadline. The high level visualization may allow a selection of levels of detail at which the versions are visualized and a selection of which versions to view as a group in the visualization. The system for generating the high level visualization may be integrated with an existing system for displaying one version at a time in full detail, and with existing approvals management and version management systems.

System for Version Visualization

Figure 1:
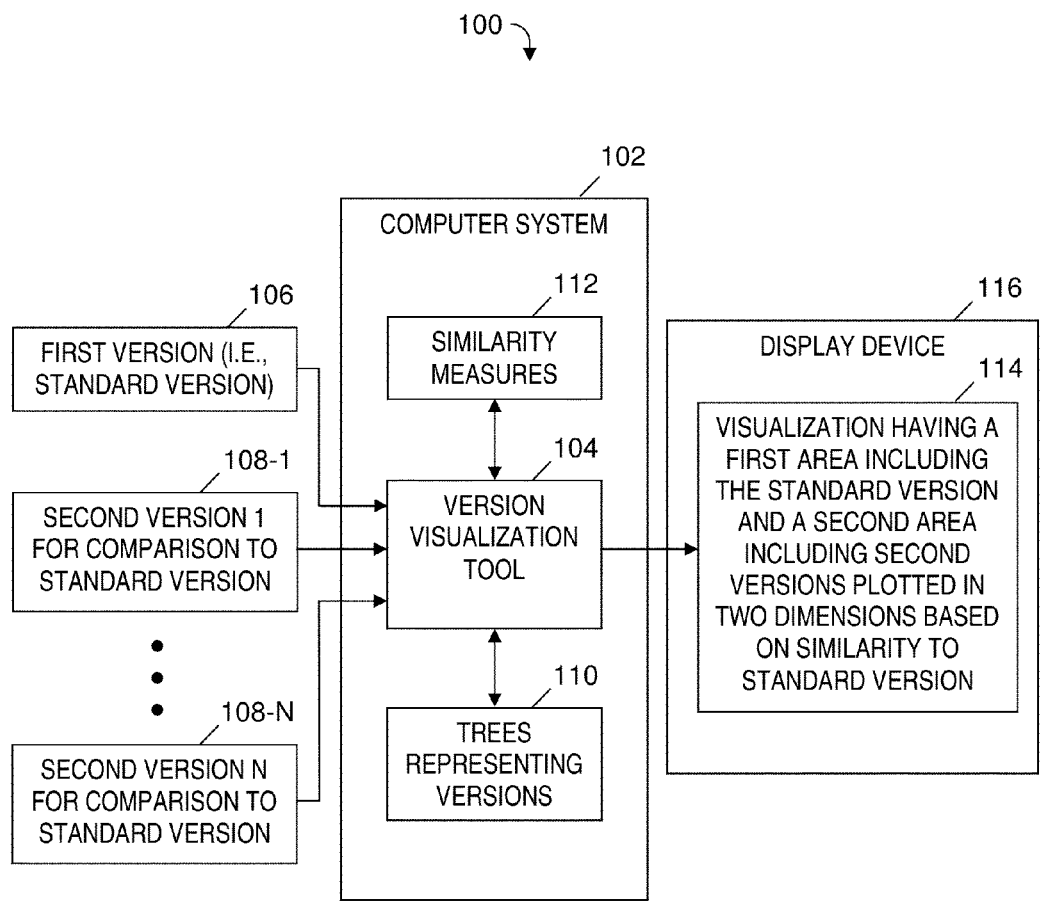
FIG. 1 is a block diagram of a system for generating a visualization of versions of a hierarchically organized object, in accordance with embodiments of the present invention.

FIG. 1 is a block diagram of a system for generating a visualization of versions of a hierarchically organized object, in accordance with embodiments of the present invention. System 100 includes a computer system 102 that runs a software-based version visualization tool 104. Version visualization tool 104 receives a first version 106 (a.k.a. standard version or unique standard version) and second versions 108-1 . . . 108-N, where N>1. Each version of standard version 106 and second versions 108-1 . . . 108-N is a version of a data object. The data object is organized in a hierarchy, where the data object has labeled nodes and numerical parameters.

Version visualization tool 104 (or another software-based tool that is not shown) generates representations of the standard version 106 and second versions 108-1 . . . 108-N as trees 110 (i.e., hierarchically organized structures) having a root node, non-root (e.g., internal and external) nodes and labeled paths based on the hierarchy in which the aforementioned data object is organized.

Version visualization tool 104 generates similarity measures 112 that measure a respective similarity between each of the second versions 108-1 . . . 108-N and standard version 106. Version visualization tool utilizes trees 110 and similarity measures 112 to generate a visualization 114 and initiate a display of visualization 114 on a display device 116. In one embodiment, visualization 114 includes a first area that includes standard version 106 and further includes a second area that includes second versions 108-1 . . . 108-N plotted in two dimensions based on similarity measures 112. The two dimensions in which the second versions 108-1 . . . 108-N are plotted are discussed in more detail below relative to the discussion of FIG. 2.

Although not shown in FIG. 1, version visualization tool 104 may also generate a visualization that includes standard version 106 in one area and one of the second versions (e.g., second version 108-1) in another area, with differences between the standard version and the second version highlighted with a visual cue (e.g., details in the second version 108-1 that are different from details in standard version 106 are presented in boldface).

The functionality of the components of computer system 102 is further described below relative to the discussions of FIG. 2, FIG. 3, FIG. 6 and FIG. 10.

Process for Version Visualization

Figure 2:
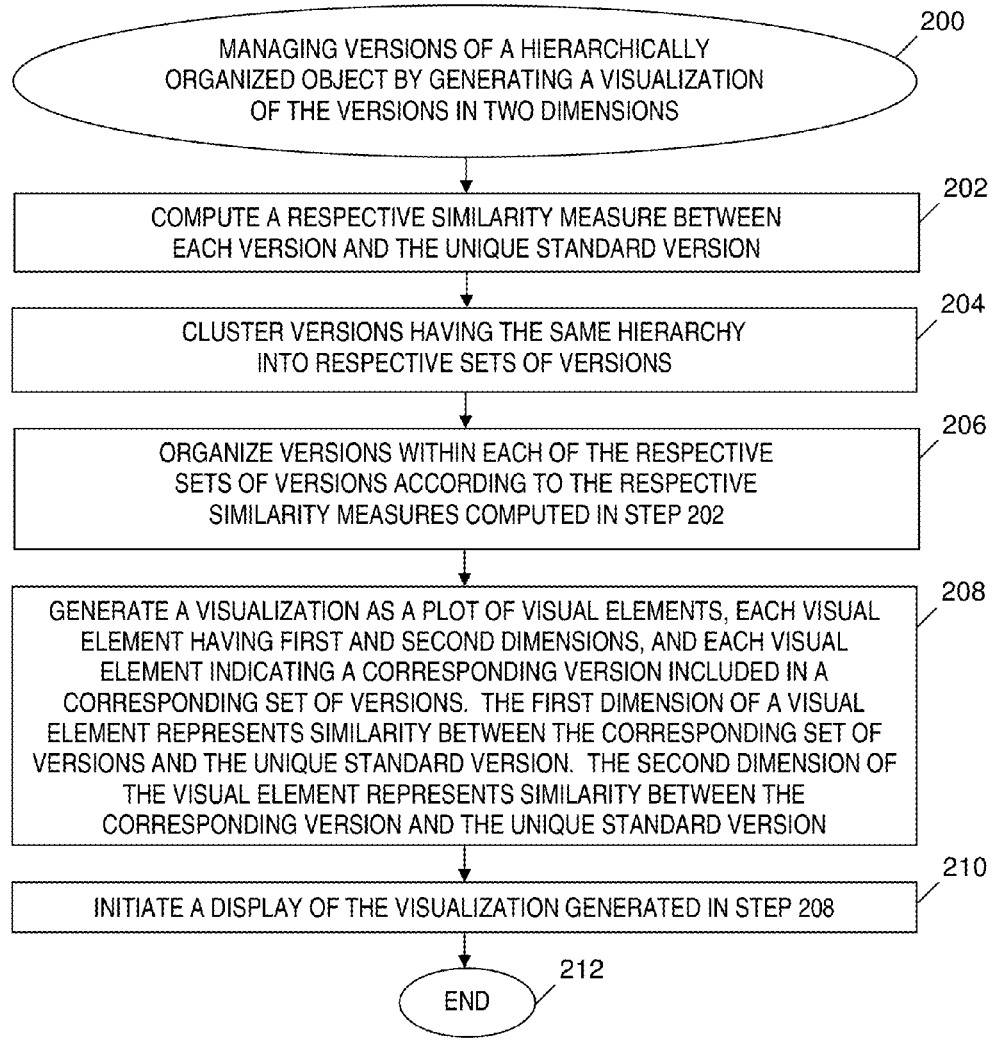
FIG. 2 is a flowchart of a process of generating a two-dimensional visualization of versions of a hierarchically organized object, where the process is implemented by the system of FIG. 1, in accordance with embodiments of the present invention.

FIG. 2 is a flowchart of a process of generating a two-dimensional visualization of versions of a hierarchically organized object, where the process is implemented by the system of FIG. 1, in accordance with embodiments of the present invention. In one embodiment, the process of FIG. 2 provides a two dimensional ordering of versions 108-1 . . . 108-N (see FIG. 1) based on structural similarity that determines a layout of a scrollable visualization. The process of FIG. 2 starts at step 200. In step 202, version visualization tool 104 (see FIG. 1) computes a respective similarity measure between each of the second versions 108-1 . . . 108-N (see FIG. 1) and the unique standard version 106 (see FIG. 1).

In step 204, version visualization tool 104 (see FIG. 1) clusters the second versions 108-1 . . . 108-N (see FIG. 1) having the same hierarchy into respective sets of versions. In one embodiment, the clustered second versions are the versions that have identical sets of paths with nonzero leaf node data in the trees that represent each of the clustered second versions.

In step 206, based on the respective similarity measures computed in step 202, version visualization tool 104 (see FIG. 1) organizes the versions within each of the respective sets of versions that result from the clustering in step 204. For example, step 206 may order the versions in the set so that the first ordered version is the most similar to standard version 106 (see FIG. 1), the second ordered version is the next most similar to standard version 106 (see FIG. 1), etc., until the last ordered version is the least similar to standard version 106 (see FIG. 1).

In step 208, version visualization tool 104 (see FIG. 1) generates a visualization 114 (see FIG. 1) as a plot of a visual elements, each visual element having first and second dimensions (i.e., the plot is two-dimensional), and each visual element indicating a corresponding version included in a corresponding set of versions formed by the clustering in step 204.

The first dimension of a visual element in visualization 114 (see FIG. 1) represents similarity between the corresponding set of versions and the unique standard version 106 (see FIG.

1). The similarity between a corresponding set of versions and the unique standard version is based on the similarity measure computed in step 202 for a particular version within the corresponding set of versions. Based on the similarity measures computed in step 202, the aforementioned particular version is the most similar to unique standard version 106 (see FIG. 1) as compared to any other version in the corresponding set of versions. Further, the particular version that is most similar to standard version 106 (see FIG. 1) is determined by the organization of the versions performed in step 206.

The second dimension of the visual element in visualization 114 (see FIG. 1) represents similarity between the corresponding version and the unique standard version 106 (see FIG. 1). The similarity between the corresponding version and the unique standard version 106 (see FIG. 1) is based on the similarity measure computed in step 202 for the corresponding version.

In one embodiment, the visualization generated in step 208 includes versions within each set of versions clustered in step 204 that are ordered from left to right in a most similar to least similar order based on the measurements of similarity computed in step 202, so that the leftmost element in an ordered set of versions is more similar to the standard version 106 (see FIG. 1) than any other version in the ordered set of versions. That is, the aforementioned second dimension is oriented in the left to right order. The sets of versions clustered in step 204 are also ordered in the visualization in a top to bottom order by most similar leftmost element to least similar leftmost element based on the measurements of similarity computed in step 202, so that the leftmost element of the topmost set of versions is more similar to the standard version 106 (see FIG. 1) than any other leftmost element of any other set of versions. That is, the aforementioned first dimension is oriented in the top to bottom order.

In alternate embodiments, the orientations of the aforementioned first and second dimensions may be reversed and/or rotated. For example, the second dimension may be oriented in a top to bottom order and the first dimension may be oriented in a left to right order. As another example, the second dimension may be oriented in top to bottom order and the first dimension may be oriented in a right to left order.

In step 210, version visualization tool 104 (see FIG. 1) initiates a display on display device 116 (see FIG. 1) of the visualization generated in step 208. The process of FIG. 2 ends at step 212.

In one embodiment, the visualization generated by the process of FIG. 2 may include parameters for each version of a proposal for providing a service, such as a projected cost, potential approvers, an approver who provided approval, a date and time of an approval, a projected approval delay time, and/or a deadline. The projected approval delay may be represented by a projected time to a decision and a projected likelihood that the proposal will be approved rather than rejected. In one embodiment, version visualization tool 104 (see FIG. 1) retrieves historical data from a data repository coupled to computer system 102 (see FIG. 1). The retrieved historical data indicates the time taken for approval of similar versions, where a version that is similar is based on a computed difference (as described below in the section entitled "Difference") that does not exceed a user-specified maximum difference. In one embodiment, the deadline is ignored in the computation of the difference.

Figure 3:
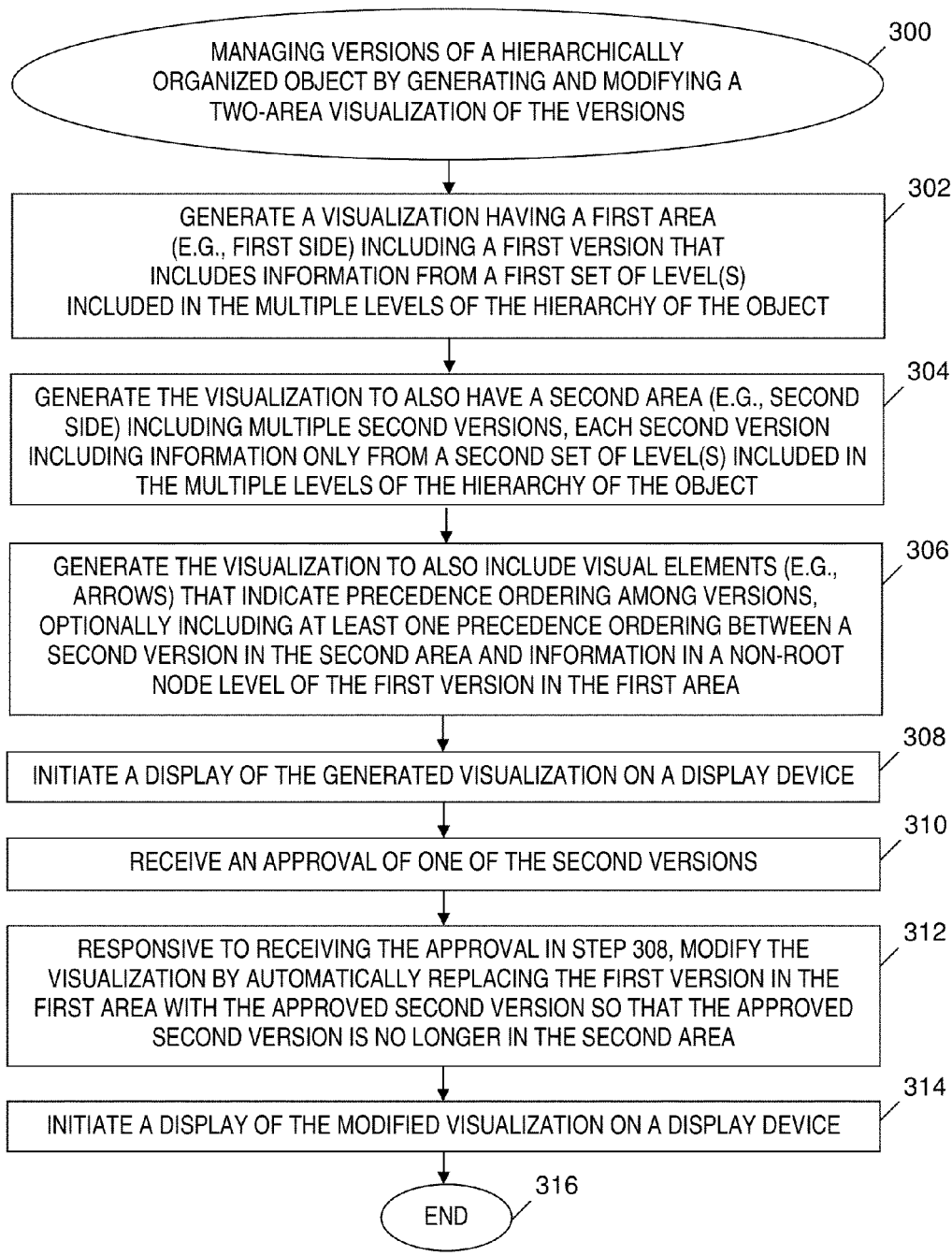
FIG. 3 is a flowchart of a process of generating and modifying a two-area visualization of versions of a hierarchically organized object, where the process is implemented by the system of FIG. 1, in accordance with embodiments of the present invention.

FIG. 3 is a flowchart of a process of generating and modifying a two-area visualization of versions of a hierarchically organized object, where the process is implemented by the system of FIG. 1, in accordance with embodiments of the present invention. In one embodiment, the process of FIG. 3 provides a two-sided visualization of that includes standard version 106 (see FIG. 1) on a first side of the visualization at one level of detail and versions 108-1 . . . 108-N (see FIG. 1) on a second side of the visualization at another level of detail. In one embodiment, the process of FIG. 3 provides an automatic modification of a visualization in response to receiving an approval of a version, so that the most recently approved version replaces the standard version on the first side of the visualization.

The process of FIG. 3 starts at step 300. In step 302, version visualization tool 104 (see FIG. 1) generates a visualization having a first area (e.g., a first side) including first version 106 (see FIG. 1) of the hierarchically organized object, where the first version includes information from a first set of one or more levels included in the multiple levels of the hierarchy of the object.

In step 304, version visualization tool 104 (see FIG. 1) generates the visualization to also include a second area including multiple second versions 108-1 . . . 108-N (see FIG. 1) of the hierarchically organized object. Each of the second versions 108-1 . . . 108-N (see FIG. 1) includes information from a second set of one or more levels included in the multiple levels of the hierarchy of the object. In one embodiment, the second set of one or more levels is different from the first set of one or more levels described above relative to step 302. In one embodiment, the first version includes information from multiple levels of the hierarchy of the object and each second version includes information from only the root node level of the hierarchy of the object.

In step 306, version visualization tool 104 (see FIG. 1) generates the visualization to also include one or more visual elements (e.g., arrows) that indicate precedence ordering among the versions 106 and 108-1 . . . 108-N. As used herein, precedence ordering is defined as an ordering from a first version to a second version that indicates the second version is generated from a modification of the first version. In one embodiment, the generated visual element(s) includes a visual element that indicates precedence ordering between information at a root node level for second version 108-1 (see FIG. 1) in the second area and information in a non-root node (e.g., leaf node or internal node) level for first version 106 (see FIG. 1) in the first area.

In an alternate embodiment, Step 306 generates visual elements that indicate temporal ordering among the versions. For example, in the alternate embodiment, a generated visual element from a first version to a second version indicates that the time stamp of the first version precedes the time stamp of the second version.

When a user saves changes to a first version having a date-time stamp, a second version is created, which has a new date-time stamp. System 100 (see FIG. 1) maintains a link from the second version to the first version to indicate the precedence ordering where the second version was generated by modifying the first version. In one embodiment, a user requests the generation of the visualization as in step 306 so that the visual elements (e.g., arrows) are displayed to indicate the precedence ordering among versions. When a version is displayed at a level that shows service elements at any level of the hierarchy, then the visual elements (e.g., arrows) are displayed to indicate which service element was changed to modify the first version to make the second version. For example, multiple arrows may start from one version and be drawn to multiple service elements. Phantom service elements may be displayed to indicate the service elements that have been removed from a first version to make the second version.

In step 308, version visualization tool 104 (see FIG. 1) initiates a display on display device 116 (see FIG. 1) of the visualization generated in step 306.

In step 310, version visualization tool 104 (see FIG. 1) receives an approval of one of the second versions 108-1 . . . 108-N included in the second area of the visualization generated in step 306.

In step 312, responsive to the approval received in step 310, version visualization tool 104 (see FIG. 1) modifies the visualization by automatically replacing the first version 106 (see FIG. 1) in the first area with the approved second version (e.g., second version 108-1 in FIG. 1) and removes the approved second version from the second area.

In step 314, version visualization tool 104 (see FIG. 1) initiates a display on display device 116 (see FIG. 1) of the visualization modified in step 312. The process of FIG. 3 ends at step 316.

In one embodiment, steps 310, 312 and 314 are optional steps. In one embodiment, the process of FIG. 3 is combined with the process of FIG. 2 so that the generated visualization includes second versions 108-1 . . . 108-N (see FIG. 1) displayed in the two dimensions provided by the process of FIG. 2 and further includes standard version 106 (see FIG. 1) in a first area of the visualization and the second versions 108-1 . . . 108-N (see FIG. 1) in the second area of the visualization.

In one embodiment, the first area is a left side of a visualization and the second area is a right side of the visualization. In alternate embodiments, the areas (e.g., sides) in which the first version and second versions are included in the visualization generated in step 306 and modified in step 312 may be reversed or rotated. For example, the first version may be included in a top area of the visualization and the second versions may be included in a bottom area of the visualization. As another example, the first version may be included on the right side of the visualization and the second versions may be included on the left side of the visualization.

As one example, standard version 106 (see FIG. 1) and second versions 108-1 . . . 108-N (see FIG. 1) are versions of proposals for providing one or more services. Each proposal version is represented as a tree included in trees 110 (see FIG. 1) each tree has labels on its edges. The root node of a tree includes the following information:

Date-time stamp of the proposal indicating the date and time the proposal was received.

Link to a previous version based on precedence or temporal ordering

Deadline for completing the work required to provide the service

Total revenue

Each node in the tree includes the following information about approval status, if needed:

Required approvals
Rule
Potential approvers
Completed approvals
Date-time approved
Approved by Each leaf node in the tree includes the following information:

Quantity of service by time unit
Projected cost by time unit
Projected revenue by time unit In cost summary form, a leaf node in the tree includes the information listed below (and the root node includes no total revenue):

Total quantity of service
Total duration
Total projected cost

In this example, the system tracks the approval process by recording time information regarding submissions and approvals or rejections.

FIG. 4A is an example of a summary tree that represents an approved version of a hierarchically organized object, where the approved version is visualized by the system of FIG. 1, in accordance with embodiments of the present invention. Summary tree 400 represents an approved version (i.e., Version A) based on an approval by an approver identified as "2" on Apr. 28, 2011 (see the line in tree 400 that includes "Completed" and "Date: 11/04/28 By 2") and based on there being no required approvals that are pending (see the line in tree 400 that includes "Required approvals (none)"). Furthermore, Summary tree 400 includes details such as a quantity of service under the column labeled "Q", a duration under the column labeled "D" and a projected cost under the column labeled "$." For example, for a proposal version represented by tree 400, a level of detail labeled Accounting s15 is associated with a quantity of service of 1, a duration of 36 and a projected cost of 2.32 (see the line in tree 400 that includes "Accounting s15").

FIG. 4B is an example of a summary tree that represents a version of a hierarchically organized object, where the version requires approval and is visualized by the system of FIG. 1, in accordance with embodiments of the present invention. Summary tree 450 indicates a version (i.e., Version C) that is not yet approved based on a required approval needing to be approved by any of the approvers identified as 2, 4, 5 or 6 (see the line in tree 450 under "Required approvals" that includes "Approvers {2,4,5,6}). The version represented by tree 450 may be a modification of tree 400 (see FIG. 4B), where the modification includes a modification of the quantity of service for Accounting s15 (i.e., the quantity of service of 1 in tree 400 in FIG. 4A is changed to 2 in tree 450), a modification of the projected cost for Accounting s18 (i.e., the projected cost of 18.4 in tree 400 in FIG. 4A is changed to 9.2 in tree 450), and an addition of a new path that is not included in tree 400 in FIG. 4A (i.e., the path indicated by Strategy, Tech Forecast, Futurist s18 in tree 450).

In the examples shown in FIG. 4A and FIG. 4B, Version A is complete and approved, but Version C requires approval from one person out of a set of four potential approvers. Version visualization tool 104 retrieves recent historical data that includes statistics regarding the approvals related performance of the four potential approvers restricted to versions whose difference to a standard version is within a user-specified maximum difference. The version visualization tool 104 (see FIG. 1) computes a projected approval delay that is expected for Version C or, in the case in which there is insufficient historical data to make the computation, the tool 104 (see FIG. 1) generates an indication that the approval delay is unpredictable.

Difference

In one embodiment, version visualization tool 104 (see FIG. 1) constructs a vector space with two dimensions for every labeled path in every tree representing a version (i.e., every tree in trees 110 (see FIG. 1)). One dimension is for a number of time units with nonzero projected cost (i.e., duration) and the other dimension is for total projected cost. To distinguish versions with distinct deadlines, a third dimension for a deadline is optionally added to the vector space for every labeled path in every tree. In one embodiment, the version visualization tool 104 (see FIG. 1) generates the trees 110 (see FIG. 1) and the vector space prior to step 202 in FIG. 2 and prior to step 302 in FIG. 3.

For Version A represented by tree 400 in FIG. 4A and for Version C represented by tree 450 in FIG. 4B, the corresponding vectors constructed in the vector space are shown in the Version A and Version C columns of Table 1. The paths in FIG. 4A and FIG. 4C are indicated in abbreviated form in the Path column in Table 1. The path indicated by Supply Chain, Order Entry, Accounting s15 in FIG. 4A and FIG. 4B is indicated by Su.O.A.s15 in Table 1. The path indicated by Supply Chain, Order Entry, Clerical s13 in FIG. 4A and FIG. 4B is indicated by Su.O.C.s13 in Table 1. The path indicated by Supply Chain, Approvals, Accounting s18 in FIG. 4A and FIG. 4B is indicated by Su.A.A.s18 in Table 1. The path indicated by Strategy, Tech Forecast, Futurist s18 in FIG. 4B is indicated by St.T.F.s18 in Table 1.

Values for the duration and projected cost dimensions are included in Table 1 for each path and for each version. For example, for Path Su.O.A.s15, the value for the duration dimension is 36 for both Version A and Version C, the value for the projected cost dimension is 2.32 for Version A, and the value for the projected cost dimension is 5.65 for Version C.

TABLE 1

| Path | Version A | Version C |
|---|---|---|
| Su.O.A.sl5 | 36 | 36 |
| | 2.32 | 5.65 |
| Su.O.C.sl3 | 36 | 36 |
| | 1.8 | 1.8 |
| Su.A.A. sl8 | 36 | 36 |
| | 18.4 | 9.2 |
| St.T.F.sl8 | 0 | 12 |
| | 0 | 4.1 |

The difference between two versions is measured by 1−cosine of the angle between the two vectors constructed from the labeled paths of the trees representing the two versions. The cosine value is also the correlation coefficient between the values in the two vectors. The aforementioned difference is the highest level summary of difference. For Version A and Version C shown in FIG. 4A and FIG. 4B, respectively, the cosine of the angle between the vectors shown in Table 1 is 0.94 and the difference between Version C and Version A is 0.06 (i.e., 1−cosine or 1−0.94). Table 2 includes the values used to compute the cosine value for Version A and Version C in FIG. 4A and FIG. 4B, respectively.

the difference is represented by boldface or highlighted by another visual cue. Table 3 includes a more detailed summary of differences in duration and projected cost for Versions A and C.

TABLE 3

| Path | Projected Cost or Duration | Difference between Version C and Version A |
|---|---|---|
| Su.O.A.sl5 | Projected cost | 3.33 |
| Su.A.A.sl8 | Projected cost | −9.2 |
| St.T.F.sl8 | Duration | 12 |
| St.T.F.sl8 | Projected cost | 4.1 |

In one embodiment, version visualization tool 104 (see FIG. 1) generates a visualization including first version 106 (see FIG. 1) and a second version (e.g., second version 108-1 in FIG. 1) at a most detailed level. For the paths in which the tree representing the second version differs from that of the first version, the path is presented in the visualization in boldface or with another visual cue. For each path in the first version that does not appear in the second version, version visualization tool 104 (see FIG. 1) adds a phantom path to the tree representing the second version, where the phantom path has labels and quantities distinguished by a change of font or by another visual cue.

Visualization

Figure 5:
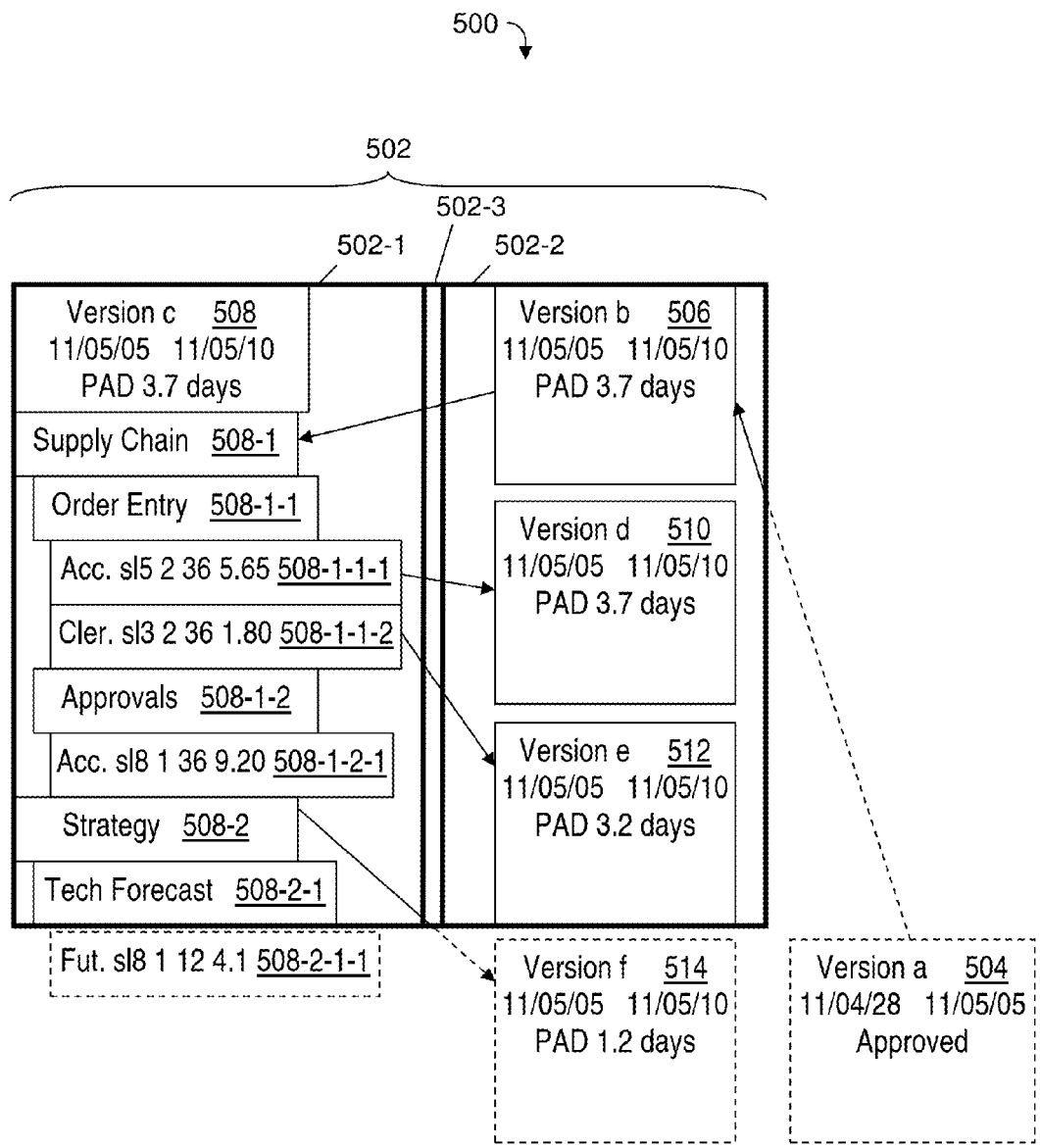
FIG. 5 is an example of a two-dimensional and two-area visualization of versions of a hierarchically organized object, where the visualization is generated by the process of FIG. 2 and the process of FIG. 3, in accordance with embodiments of the present invention.

FIG. 5 is an example of a two-dimensional and two-area visualization of versions of a hierarchically organized object, where the visualization is generated by the process of FIG. 2 and the process of FIG. 3, in accordance with embodiments of the present invention. Visualization 500 includes a visible viewing surface 502 of the visualization 500. Visible viewing surface 502 includes a left side 502-1, a right side 502-2 and an optional central gutter 502-3 between left side 502-1 and right side 502-2. Left side 502-1 may be the first area generated in step 302 (see FIG. 3). Right side 502-2 may be the second area generated in step 304 (see FIG. 3). Visible viewing surface 502 does not include any rectangle, arrow or portion of an arrow that is depicted with dashed lines in FIG. 5. For example, visible viewing surface 502 does not include

TABLE 2

| Vector Version A | A-mean of A | Square of (A-mean of A) | Norm. A | Vector Version C | C-mean of C | Square of (C-mean of C) | Norm. C | Norm. A * Norm. C |
|---|---|---|---|---|---|---|---|---|
| 36.00 | 19.69 | 387.50 | 0.43 | 36.00 | 18.41 | 338.79 | 0.45 | 0.19 |
| 2.32 | −14.00 | 195.86 | −0.30 | 5.65 | −11.94 | 142.65 | −0.29 | 0.09 |
| 36.00 | 19.69 | 387.50 | 0.43 | 36.00 | 18.41 | 338.79 | 0.45 | 0.19 |
| 1.80 | −14.52 | 210.69 | −0.32 | 1.80 | −15.79 | 249.44 | −0.38 | 0.12 |
| 36.00 | 19.69 | 387.50 | 0.43 | 36.00 | 18.41 | 338.79 | 0.45 | 0.19 |
| 18.40 | 2.09 | 4.35 | 0.05 | 9.20 | −8.39 | 70.46 | −0.20 | −0.01 |
| 0.00 | −16.32 | 266.18 | −0.36 | 12.00 | −5.59 | 31.29 | −0.14 | 0.05 |
| 0.00 | −16.32 | 266.18 | −0.36 | 4.10 | −13.49 | 182.08 | −0.33 | 0.12 |
| Sum = 130.52 | | Sum = 2105.75 | | Sum = 140.75 | | Sum = 1692.29 | | Sum (i.e., cosine) = 0.94 |
| Mean of A = 16.32 | | Sqrt of sum = 45.89 | | Mean of C = 17.59 | | Sqrt of sum = 41.14 | | |

A more detailed summary of differences may be generated by listing each path on which there is a difference together with the amount of the difference in time units (i.e., duration) and in projected cost. The differences in the projected cost are represented algebraically by subtracting the quantity of the first version (i.e., Version A) from the quantity of the second version (i.e., Version C). If one of the quantities is zero, then rectangle 504 that represents Version a and the portion of the arrow starting from rectangle 504 and ending at the border of visible viewing surface 502.

Visualization 500 includes rectangles 504, 506, 508, 510, 512 and 514, which represent respective root nodes of trees representing Version a, Version b, Version c, Version d, Version e, and Version f, respectively. The PAD value included in rectangles 504, 506, 508, 510, 512 and 514 is a projected approval delay. Left side 502-1 includes a detailed view of Version c 508, showing a detailed view of the tree representing Version c:

- Rectangles 508-1 and 508-2 (i.e., Supply Chain and Strategy, respectively) represent internal nodes connected to and at a next level down from the root node represented by rectangle 508 (i.e., Version c).
- Rectangles 508-1-1 and 508-1-2 (i.e., Order Entry and Approvals, respectively) are internal nodes that are connected to and at a next level down from the Supply Chain node 508-1.
- Rectangle 508-2-1 (i.e., Tech Forecast) is an internal node connected to and at a next level down from the Strategy node 508-2.
- Rectangles 508-1-1-1 and 508-1-1-2 are leaf nodes connected to and at a next level down from Order Entry node 508-1-1.
- Rectangle 508-1-2-1 is a leaf node connected to and at a next level down from Approvals node 508-1-2.
- Rectangle 508-2-1-1 is a leaf node connected to and at a next level down from Tech Forecast node 508-2-1. Leaf node 508-2-1-1 is not currently visible in left side 502-1, but may become visible in left side 502-1 by a user utilizing a scrolling feature that scrolls through the levels of the tree representing Version c. For example, a user may scroll left side 502-1 down so that rectangle 508-2-1-1 is visible.

Each of the leaf nodes visible or potentially visible in left side 502-1 indicates three values in the following order: quantity of service, duration and projected cost. For example, rectangle 508-1-1-1 represents a leaf node labeled Acc. s15 that has a quantity of service value of 2, a duration value of 36 and a projected cost value of 5.65. The similarity measures computed in step 202 (see FIG. 2) may be cosine similarity measures that utilize, for example, the duration and projected cost values shown in the leaf nodes that are visible or are potentially visible in left side 502-1.

Right side 502-2 includes rectangles representing root nodes of trees included in trees 110 (see FIG. 1). The rectangles currently visible on right side 502-2 are Version b 506, Version d 510 and Version e 512. Via another scrolling feature that is independent of the scrolling feature for left side 502-1, the user may scroll up or down, or left or right to make other rectangles visible in right side 502-2. For example, a user may scroll right side 502-2 down to make Version f 514 visible and to make Version b 506 not visible in right side 502-2. As another example, after scrolling right side 502-2 down, the user may scroll right side 502-2 to the right so that Version a 504 is visible and Version f 514 is not visible in right side 502-2.

When visualization 500 is displayed on a display device (see step 210 in FIG. 2, step 308 in FIG. 3 and step 314 in FIG. 3), rectangles 508-2-1-1, 514 and 504 are not visible in the display device, as is indicated by their dashed borders in visualization 500.

Arrows in visualization 500 indicate precedence ordering and are generated by step 306 (see FIG. 3). The arrow from Version b 506 to Supply Chain 508-1 indicates that Version c is a modification of Version b and the modification includes change(s) in parameter value(s) at one or more nodes below the level of Supply Chain 508-1. The arrow from rectangle 508-1-1-1 to Version d 510 indicates that Version d is a modification of Version c and the modification includes a change in a parameter value in the leaf node represented by rectangle 508-1-1-1. The arrow from rectangle 508-1-1-2 to Version e 512 indicates that Version e is a modification of Version c and the modification includes a change in a parameter value in the leaf node represented by rectangle 508-1-1-2. The arrow from Strategy 508-2 to Version f 514 indicates that Version f is a modification of Version c and the modification includes change(s) in parameter value(s) at one or more nodes below the level of Strategy 508-2.

The two dimensional ordering of Versions b, d, e, f and a in rows and columns in visualization 500 is generated in step 208 (see FIG. 2). Because Version f 514 and Version a 504 are in the same row, the path structures of the trees representing Version f and Version a are identical. Furthermore, as compared to Version a, Version f is more similar to Version c, as indicated by Version f 514 being the leftmost element of the row that includes Version f 514 and Version a 504 in visualization 500. The measurements of similarity of Version f to Version c and Version a to Version c are computed in step 202 (see FIG. 2). Version f and Version a are clustered together in one row of visualization 500 in step 204 (see FIG. 2). Version f 514 is ordered in step 206 (see FIG. 2) as the leftmost element of the row that includes Version f 514 and Version a 504.

Of the versions that are visible or potentially visible in right side 502-2 (i.e., Versions, b, d, e, f and a), Version b 506 is the most similar to Version c 508 (i.e., the standard version on left side 502-1), as is indicated by Version b 506 being the leftmost element (and only element) of the topmost row of the two dimensional ordering in visualization 500.

Figure 6:
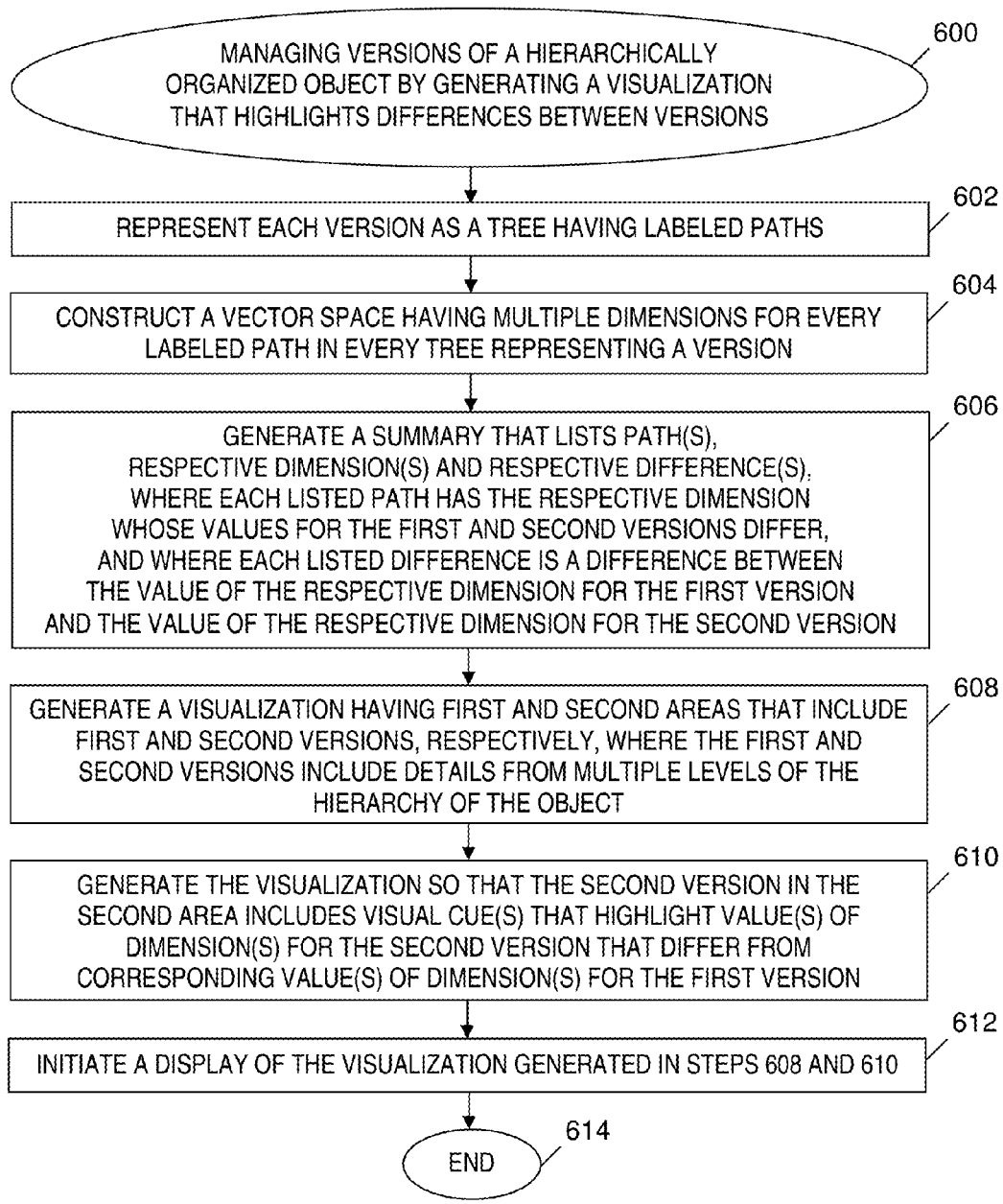
FIG. 6 is a flowchart of a process of generating a visualization of versions of a hierarchically organized object, where the visualization highlights differences between the versions, and where the process is implemented by the system of FIG. 1, in accordance with embodiments of the present invention.

FIG. 6 is a flowchart of a process of generating a visualization of versions of a hierarchically organized object, where the visualization highlights differences between the versions, and where the process is implemented by the system of FIG. 1, in accordance with embodiments of the present invention. The process of FIG. 6 starts at step 600. In step 602, version visualization tool 104 (see FIG. 1) represents each version as a tree having labeled paths.

In step 604, version visualization tool 104 (see FIG. 1) constructs a vector space having multiple dimensions for every labeled path in every tree included in trees 110 (see FIG. 1). In one embodiment, step 604 includes generating vectors in the vector space so that each vector has two parameters (i.e., duration and projected cost). For example, a vector space including a first vector of duration and projected cost values of dimensions of paths in a tree representing Version A (see FIG. 4A) and a second vector of duration and projected cost values of dimensions of paths in another tree representing Version C (see FIG. 4B) is shown in Table 1 presented above. Table 1 depicts the first vector as including the values 36, 2.32, 36, 1.8, 36, 18.4, 0 and 0, and the second vector as including the values 36, 5.65, 36, 1.8, 36, 9.2, 12 and 4.1.

In step 606, version visualization tool 104 (see FIG. 1) generates a summary that lists one or more paths, respective dimension(s), and respective differences(s). Each listed path has the respective dimension whose parameter values for the first second versions differ. Each listed difference is a difference between the value of the respective dimension for the first version and the value of the respective dimension for the second version. Table 3 presented above includes an example of a summary generated in step 606.

In step 608, version visualization tool 104 (see FIG. 1) generates a visualization having first and second areas (e.g., left and right sides) that include a first version and a second version, respectively, of a hierarchically organized object, where the first and second versions include details from multiple levels of the hierarchically organized object.

In step 610, version visualization tool 104 (see FIG. 1) generates the visualization so that that the second version in the second area includes one or more visual cues (e.g., boldface) that highlight value(s) of dimension(s) in at least one path of a tree representing the second version, where the highlighted value(s) differ from corresponding value(s) of dimension(s) in at least one path of another tree representing the first version.

In step 612, version visualization tool 104 (see FIG. 1) initiates a display on display device 116 (see FIG. 1) of the visualization generated in steps 608 and 610. The process of FIG. 6 ends at step 614.

Figure 7:
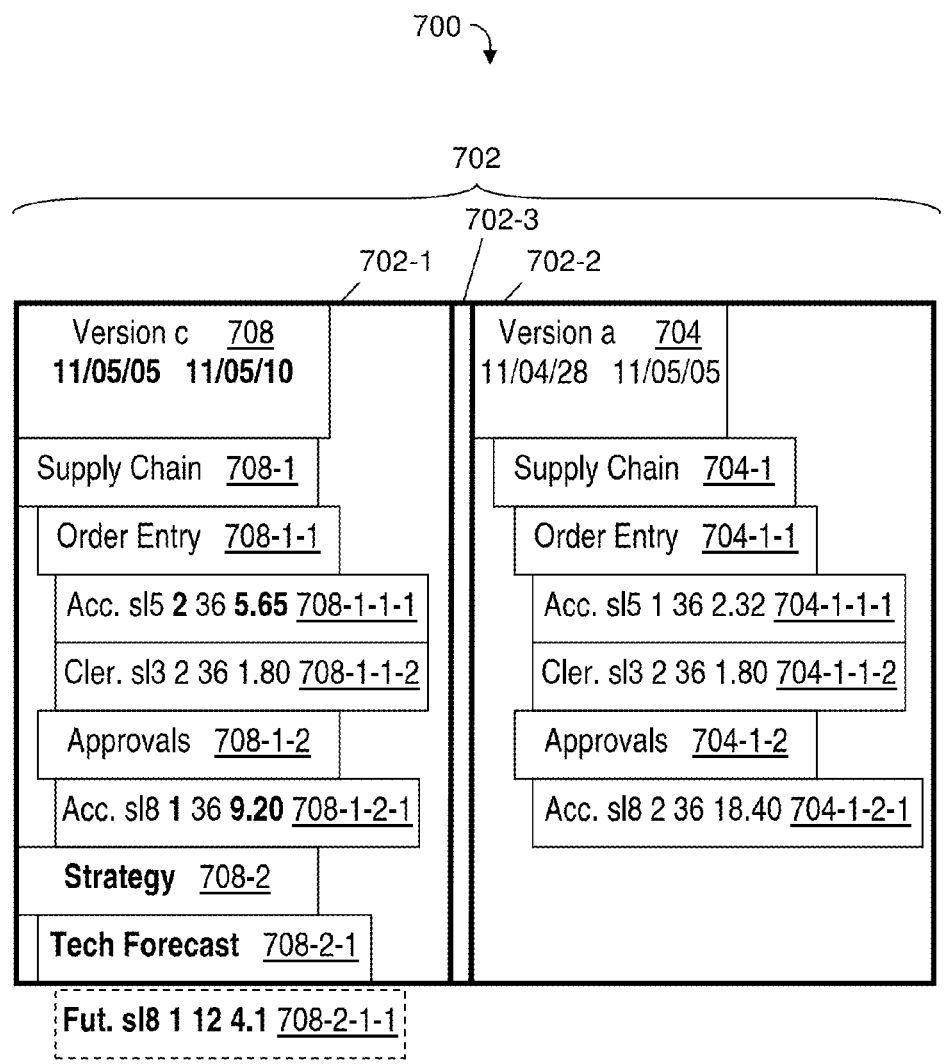
FIG. 7 is an example of a visualization generated by the process of FIG. 6 that highlights the differences between two versions of a hierarchically organized object, in accordance with embodiments of the present invention.

FIG. 7 is an example of a visualization generated by the process of FIG. 6 that highlights the differences between two versions of a hierarchically organized object, in accordance with embodiments of the present invention. Visualization 700 is an example of a visualization generated in steps 608 and 610, and includes a visible viewing surface 702, which has a left side 702-1, a right side 702-2 and an optional gutter 702-3 between left side 702-1 and right side 702-2. Left side 702-1 and right side 702-2 may be the second and first areas, respectively, generated in step 608 (see FIG. 6). Visible viewing surface 702 does not include any rectangle that is depicted with dashed lines in FIG. 7.

Visualization 700 includes rectangles 704 and 708, which represent respective root nodes of trees representing Version a and Version c, respectively. Left side 702-1 includes a detailed view of the tree representing Version c. In the tree representing Version c, Supply Chain 708-1 and Strategy 708-2 are the nodes directly below and connected to root node 708. Order Entry 708-1-1 and Approvals 708-1-2 are the nodes directly below and connected to Supply Chain node 708-1. Tech Forecast node 708-2-1 is the node directly below and connected to Strategy node 708-2. Leaf nodes 708-1-1-1 and 708-1-1-2 are directly below and connected to Order Entry node 708-1-1. Leaf node 708-1-2-1 is directly below and connected to Approvals node 708-1-2. Leaf node 708-2-1-1 is directly below and connected to Tech Forecast node 708-2-1, and is not currently visible in left side 702-1, but may become visible in left side 702-1 by scrolling left side 702-1 down.

Right side 702-2 includes a detailed view of the tree representing Version a, which is a most recent approved version, which is an example of standard version 106 (see FIG. 1). In the tree representing Version a, Supply Chain 704-1 is the node directly below and connected to root node 704. Order Entry 704-1-1 and Approvals 704-1-2 are the nodes directly below and connected to Supply Chain node 704-1. Leaf nodes 704-1-1-1 and 704-1-1-2 are directly below and connected to Order Entry node 704-1-1. Leaf node 704-1-2-1 is directly below and connected to Approvals node 704-1-2.

Each of the leaf nodes visible or potentially visible in left side 702-1 or visible in right side 702-2 indicates three values in the following order: quantity of service, duration and projected cost. For example, rectangle 708-1-1-1 represents a leaf node labeled Acc. s15 that has a quantity of service value of 2, a duration value of 36 and a projected cost value of 5.65.

In one example, visualization 700 includes right side 702-2 as the first area (see step 608 in FIG. 6), which includes a detailed view of the most recently approved version (i.e., Version a). Visualization 700 also includes left side 702-1 as the second area (see step 608 in FIG. 6), which includes a detailed view of one of the second versions (i.e., Version c) that is being compared to the most recently approved version. The boldface values 2 and 5.65 (i.e., quantity of service and projected cost values, respectively) in leaf node Acc. s15 708-1-1-1 indicate that Version c is a modification of Version a and the modification includes a change in the corresponding values in the corresponding leaf node in Version a. That is, the quantity of service value of 1 in leaf node Acc. s15 704-1-1-1 is changed to 2 in corresponding leaf node Acc. s15 708-1-1-1. Furthermore, the projected cost value of 2.32 in leaf node Acc. s15 704-1-1-1 is changed to 5.65 in corresponding leaf node Acc. s15 708-1-1-1.

The boldface values 1 and 9.20 (i.e., quantity of service and projected cost values, respectively) in leaf node Acc. s18 708-1-2-1 indicate that Version c is a modification of Version a and the modification includes a change in the corresponding values in the corresponding leaf node in Version a. That is, the quantity of service value of 2 in leaf node Acc. s18 704-1-2-1 is changed to 1 in corresponding leaf node Acc. s18 708-1-2-1. Furthermore, the projected cost value of 18.40 in leaf node Acc. s18 704-1-2-1 is changed to 9.20 in corresponding leaf node Acc. s18 708-1-2-1.

Moreover, Strategy node 708-2, Tech Forecast node 708-2-1 and leaf node Fut. s18 708-2-1-1 are in bold to indicate that these nodes were added to Version a to generate Version c.

Figure 8:
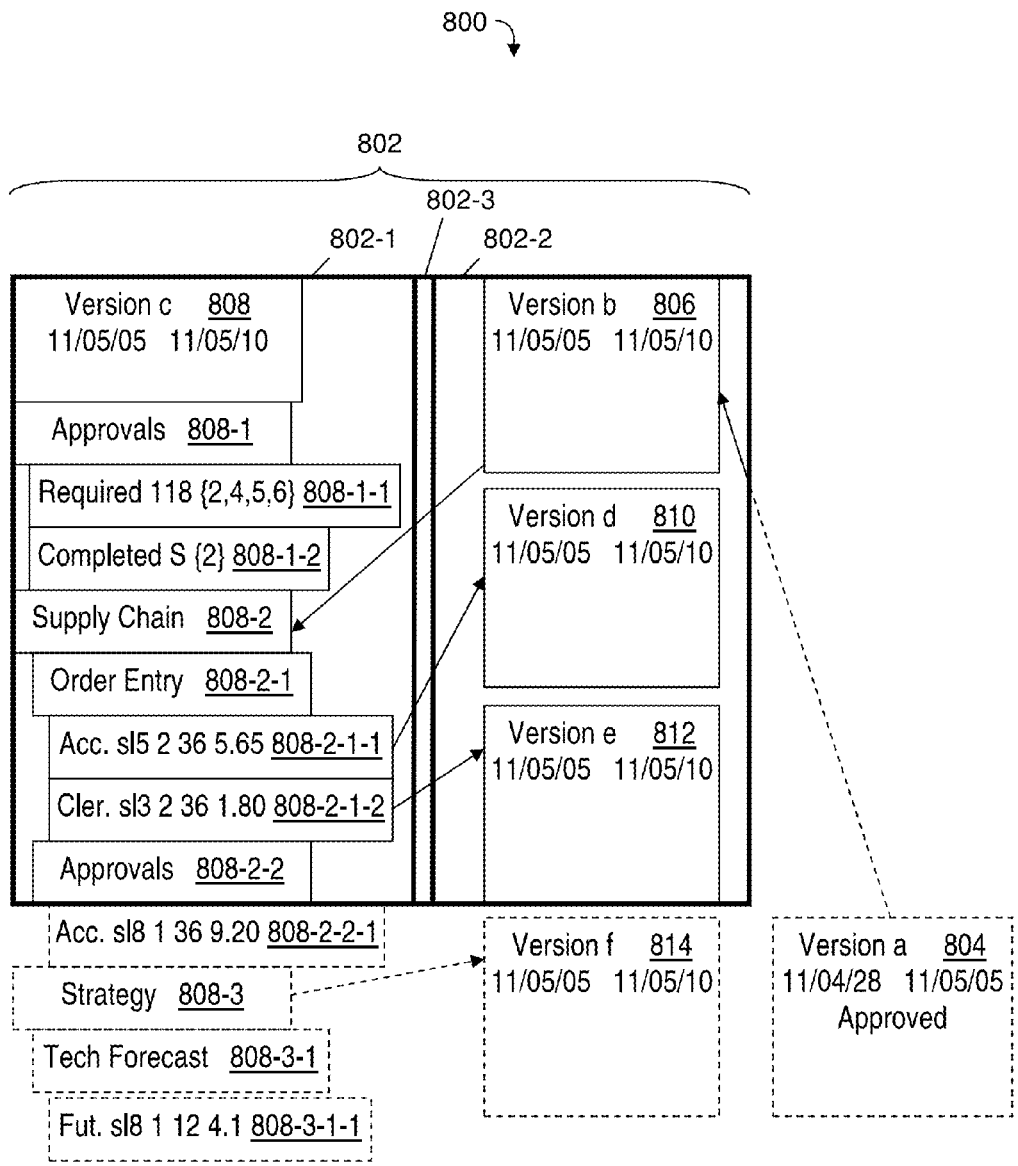
FIG. 8 is an example of a visualization generated by the process of FIG. 2 and the process of FIG. 3, where the visualization includes a summary of approvals data for a version of a hierarchically organized object, in accordance with embodiments of the present invention.

FIG. 8 is an example of a visualization generated by the process of FIG. 2 and the process of FIG. 3, where the visualization includes a summary of approvals data for a version of a hierarchically organized object, in accordance with embodiments of the present invention. Visualization 800 is an example of a visualization generated in step 208 (see FIG. 2), step 306 (see FIG. 3) and step 312 (see FIG. 3), and includes a visible viewing surface 802, which has a left side 802-1, a right side 802-2 and an optional gutter 802-3 between left side 802-1 and right side 802-2. Left side 802-1 and right side 802-2 may be the first and second areas, respectively, generated in step 306 (see FIG. 3). Visible viewing surface 802 does not include any rectangle, arrow or portion of an arrow that is depicted with dashed lines in FIG. 8.

Visualization 800 includes rectangles 804, 806, 808, 810, 812 and 814, which represent respective root nodes of trees representing Versions a, b, c, d, e and f, respectively. Left side 802-1 includes a detailed view of the tree representing Version c. In the tree representing Version c, Approvals 808-1, Supply Chain 808-2 and Strategy 808-3 are the nodes directly below and connected to root node 808. Required node 808-1-1 and Completed node 808-1-2 are the leaf nodes directly below and connected to Approvals node 808-1. Order Entry 808-2-1 and Approvals 808-2-2 are the nodes directly below and connected to Supply Chain node 808-2. Tech Forecast node 808-3-1 is the node directly below and connected to Strategy node 808-3. Leaf nodes 808-2-1-1 and 808-2-1-2 are directly below and connected to Order Entry node 808-2-1. Leaf node 808-2-2-1 is directly below and connected to Approvals node 808-2-2. Leaf node 808-3-1-1 is directly below and connected to Tech Forecast node 808-3-1. Nodes 808-2-2-1, 808-3, 808-3-1 and 808-3-1-1 are not currently visible in left side 802-1, but may become visible in left side 802-1 by scrolling left side 802-1 down.

Right side 802-2 includes Version b 806, Version d 810 and Version e 812. If right side 802-2 is scrolled down, Version f 814 becomes visible and Version b 810 becomes not visible. If right side 802-2 is scrolled down and to the right, Version a 804 becomes visible and Versions 806, 810, 812 and 814 are not visible.

Visualization 800 includes arrows to indicate precedence ordering among versions a, b, c, d, e and f. For example, the arrow from Strategy node 808-3 to Version f 814 indicates that Version f is a modification of Version c and the modification includes change(s) in value(s) included in path(s) that include Strategy node 808-3.

Each of the leaf nodes visible or potentially visible in left side 802-1 indicates three values in the following order: quantity of service, duration and projected cost. For example, rectangle 808-2-1-1 represents a leaf node labeled Acc. s15 that has a quantity of service value of 2, a duration value of 36 and a projected cost value of 5.65.

Unlike visualization 500 (see FIG. 5), visualization 800 includes summary approval data shown in leaf nodes 808-1-1 and 808-1-2. For example, leaf node 808-1-1 indicates a set of potential approvers (i.e., {2,4,5,6}), and leaf node 808-1-2 indicates an approver (i.e., 2) who provided an approval.

Figure 9:
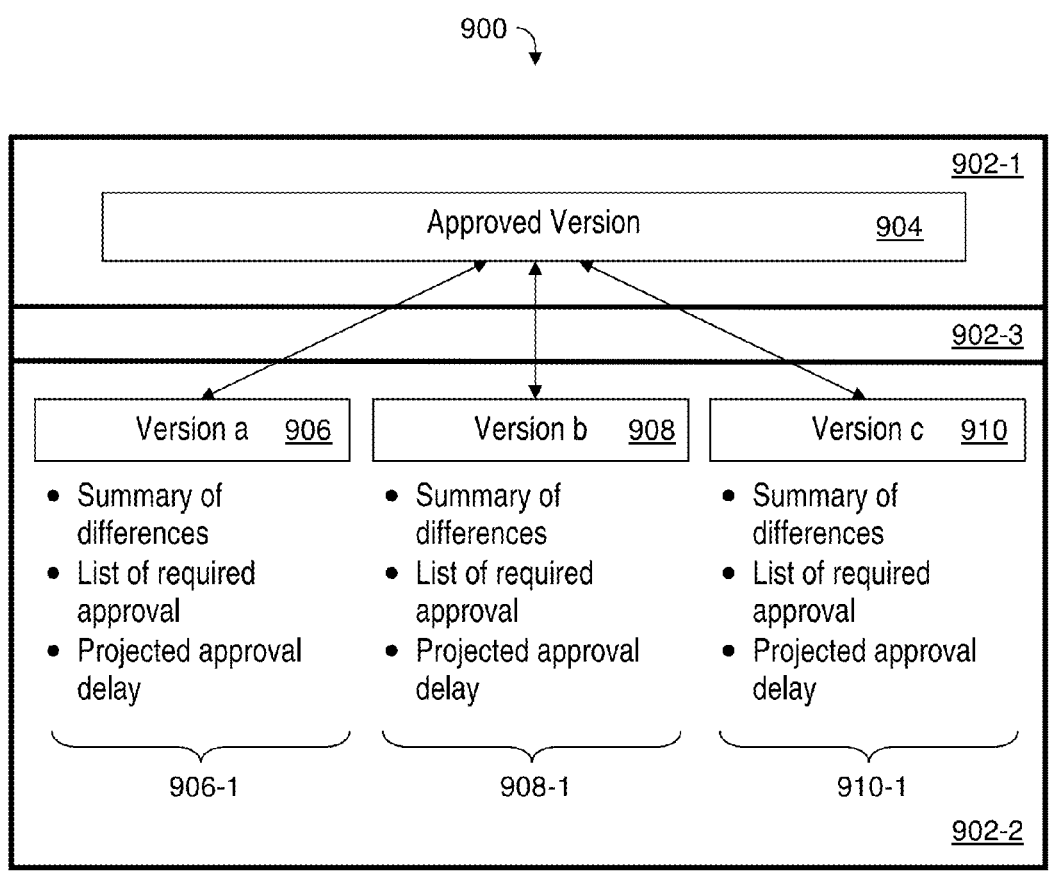
FIG. 9 is an example of a visualization of versions of a hierarchically organized object, where the visualization is generated by the system of FIG. 1 and uses an alternate layout and an alternate level of detail for the versions, in accordance with embodiments of the present invention.

FIG. 9 is an example of a visualization of versions of a hierarchically organized object, where the visualization is generated by the system of FIG. 1 and uses an alternate layout and an alternate level of detail for the versions, in accordance with embodiments of the present invention. Visualization 900 includes an alternate top to bottom layout of areas in which versions are included. Version 900 includes a top area 902-1, a bottom area 902-2 and a central gutter area 902-3 between top area 902-1 and bottom area 902-2. Top area 902-1 approved version 904 and bottom area 902-2 includes Version a 906, Version b 908 and Version c 910. Bottom area 902-2 also includes sets of information 906-1, 908-1 and 910-1 listed under Version a 906, Version b 908 and Version c 910, respectively. Each set of information includes a summary of differences between values in corresponding paths in the version in bottom area 902-2 and the approved version 904. Each set of information also includes a list of required approvals and a projected approval delay.

In visualization 900, the approved version may be standard version 106 (see FIG. 1). Unlike visualization 500 (see FIG. 5), visualization 900 includes information only at a root node level for the standard version (i.e., approved version 904), and the second versions being compared to the standard version (i.e., Versions 906, 908 and 910) are shown at more levels of detail than the standard version.

Computer System

Figure 10:
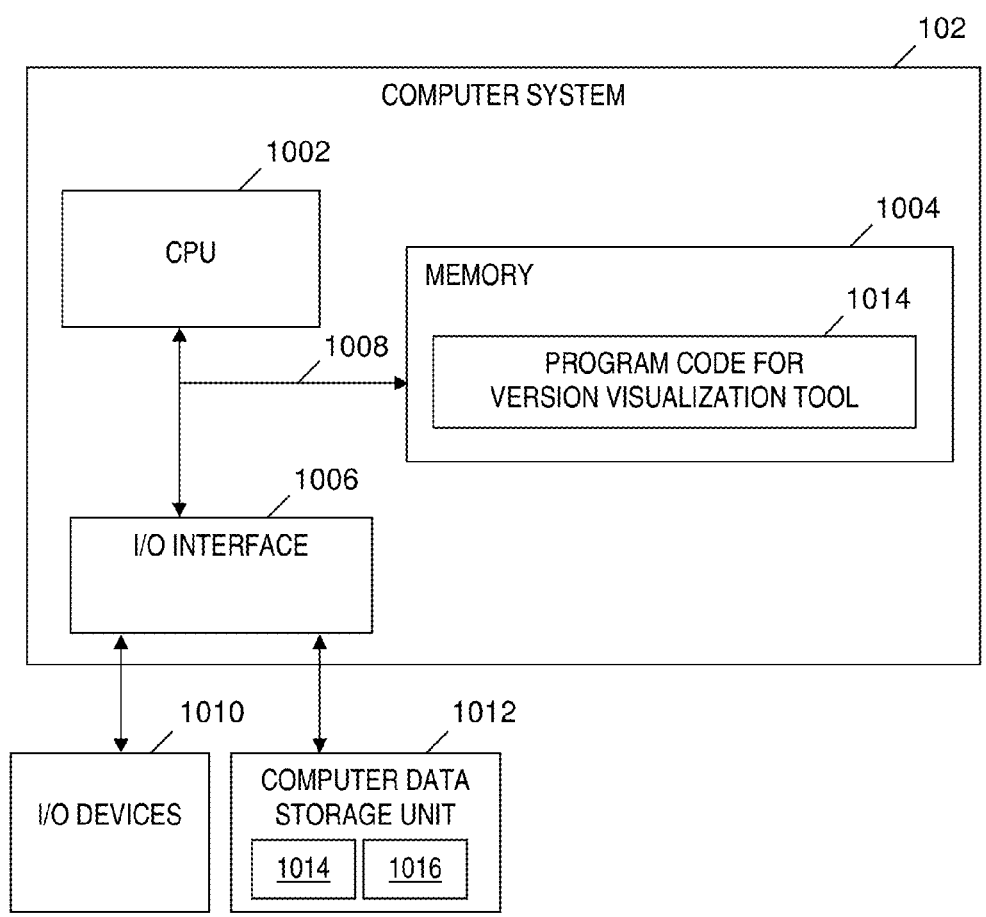
FIG. 10 is a block diagram of a computer system that is included in the system of FIG. 1 and that implements the process of FIG. 2, the process of FIG. 3 and the process of FIG. 6, in accordance with embodiments of the present invention.

FIG. 10 is a block diagram of a computer system that is included in the system of FIG. 1 and that implements the process of FIG. 2, the process of FIG. 3 and the process of FIG. 6, in accordance with embodiments of the present invention. Computer system 102 generally comprises a central processing unit (CPU) 1002, a memory 1004, an input/output (I/O) interface 1006, and a bus 1008. Further, computer system 102 is coupled to I/O devices 1010 and a computer data storage unit 1012. CPU 1002 performs computation and control functions of computer system 102, including carrying out instructions included in program code 1014 to perform a method of visualizing versions of a hierarchically organized object, where the instructions are carried out by CPU 1002 via memory 1004. CPU 1002 may comprise a single processing unit, or be distributed across one or more processing units in one or more locations (e.g., on a client and server). In one embodiment, program code 1014 includes code for version visualization tool 104 (see FIG. 1).

Memory 1004 may comprise any known computer-readable storage medium, which is described below. In one embodiment, cache memory elements of memory 1004 provide temporary storage of at least some program code (e.g., program code 1014) in order to reduce the number of times code must be retrieved from bulk storage while instructions of the program code are carried out. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN).

I/O interface 1006 comprises any system for exchanging information to or from an external source. I/O devices 1010 comprise any known type of external device, including a display device (e.g., monitor), keyboard, mouse, printer, speakers, handheld device, facsimile, etc. Bus 1008 provides a communication link between each of the components in computer system 102, and may comprise any type of transmission link, including electrical, optical, wireless, etc.

I/O interface 1006 also allows computer system 102 to store information (e.g., data or program instructions such as program code 1014) on and retrieve the information from computer data storage unit 1012 and/or another computer data storage unit (not shown) coupled to computer system 102. Computer data storage unit 1012 may comprise any known computer-readable storage medium, which is described below. For example, computer data storage unit 1012 may be a non-volatile data storage device, such as a magnetic disk drive (i.e., hard disk drive) or an optical disc drive (e.g., a CD-ROM drive which receives a CD-ROM disk).

Memory 1004 and/or storage unit 1012 may store computer program code 1014 that includes instructions that are carried out by CPU 1002 via memory 1004 to visualize versions of a hierarchically organized object. Although FIG. 10 depicts memory 1004 as including program code 1014, the present invention contemplates embodiments in which memory 1004 does not include all of code 1014 simultaneously, but instead at one time includes only a portion of code 1014.

Further, memory 1004 may include other systems not shown in FIG. 10, such as an operating system (e.g., Linux) that runs on CPU 1002 and provides control of various components within and/or connected to computer system 102.

Storage unit 1012 and/or one or more other computer data storage units (not shown) that are coupled to computer system 102 may store standard version 106 (see FIG. 1), second versions 108-1 . . . 108-N (see FIG. 1), similarity measures 112 (see FIG. 1) and trees 110 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 1004 and/or computer data storage unit 1012) having computer-readable program code (e.g., program code 1014) embodied or stored thereon.

Any combination of one or more computer-readable mediums (e.g., memory 1004 and computer data storage unit 1012) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 1014) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1014) embodied on a computer-readable medium may be transmitted using any appropriate medium, including but not limited to wireless, wireline, optical fiber cable, RF, etc., or any suitable combination of the foregoing.

Computer program code (e.g., program code 1014) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 10. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3 or FIG. 6) and/or block diagrams of methods, apparatus (systems) (e.g., FIG. 1 and FIG. 10), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1014). These computer program instructions may be provided to one or more hardware processors (e.g., CPU 1002) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 1004 or computer data storage unit 1012) that can direct a computer (e.g., computer system 102), other programmable data processing apparatus, or other devices to function in a particular manner, such that the instructions (e.g., program 1014) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 1014) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to visualizing versions of a hierarchically organized object. Thus, an embodiment of the present invention discloses a process for supporting computer infrastructure, wherein the process comprises providing at least one support service for at least one of integrating, hosting, maintaining and deploying computer-readable code (e.g., program code 1014) in a computer system (e.g., computer system 102) comprising one or more processors (e.g., CPU 1002), wherein the processor(s) carry out instructions contained in the code causing the computer system to visualize versions of a hierarchically organized object.

In another embodiment, the invention provides a method that performs the process steps of the invention on a subscription, advertising and/or fee basis. That is, a service provider, such as a Solution Integrator, can offer to create, maintain, support, etc. a process of visualizing versions of a hierarchically organized object. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3 and FIG. 6 and the block diagrams in FIG. 1 and FIG. 10 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1014), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of visualizing versions of a hierarchically organized object, the object having labeled nodes and numerical parameters, the versions including a unique standard version, the method comprising the steps of:
computing a respective similarity measure between each version and the unique standard version;
clustering versions having identical hierarchies into respective sets of versions;
organizing versions within each of the respective sets of versions according to the computed respective similarity measures;
generating a visualization as a plot having first and second dimensions, wherein the first dimension represents similarity between a set of versions and the unique standard version, and wherein the second dimension represents similarity between a version and the unique standard version;
representing each version as a respective tree having labeled paths;
constructing a vector space having multiple dimensions for each labeled path of every tree, wherein the step of constructing the vector space includes constructing each vector in the vector space to have first and second parameters for each respective labeled path, wherein the first parameter indicates a duration for completing work associated with a service and a respective labeled path, wherein the second parameter indicates a cost of providing the work, and wherein the object is a document that indicates a proposal for a service provider to provide the service to a client;
generating a second visualization having first and second areas that include first and second versions, respectively, wherein the first and second versions each include information from multiple levels of the respective trees; and
generating the second visualization so that the second version in the second area includes a visual cue that highlights a value of a dimension for a labeled path of the respective tree representing the second version, wherein based on the constructed vector space, the highlighted value differs from a corresponding value of a dimension for a labeled path of the respective tree representing the first version,
wherein the step of computing the respective similarity measure includes computing the respective similarity measure between the first and second versions by normalizing a first vector associated with the first version, normalizing a second vector associated with the second version, and determining a product of the normalized first vector and the normalized second vector based on the first parameter indicating the duration and the second parameter indicating the cost,
wherein the steps of computing, clustering, organizing, generating the visualization, representing, constructing, generating the second visualization having first and second areas, and generating the second visualization so that the second version in the second area includes the visual cue are performed by at least one computer.

2. The method of claim 1, wherein the step of computing the respective similarity measure includes calculating a respective cosine similarity between each version and the unique standard version.

3. The method of claim 1, comprising the step of retrieving historical approval delay times for versions whose similarity to a version satisfies a user-specified criterion, wherein the numerical parameters include a projected time to a decision about whether to approve the version and a projected likelihood of the decision indicating an approval of the version based on the retrieved historical approval delay times.

4. The method of claim 1, comprising the steps of:
representing each version as a respective tree having labeled paths;
constructing a vector space having multiple dimensions for each labeled path of every tree; and
generating a summary that lists one or more labeled paths, one or more respective dimensions and one or more respective differences, wherein each listed path includes a respective dimension whose values for a first version and a second version differ based on the constructed vector space, and wherein each listed respective difference indicates how much the values of the respective dimension for the first and second versions differ.

5. The method of claim 1, wherein the step of generating the visualization includes generating the visualization in a scrollable map in which a first portion of the visualization is visible and a second portion of the visualization is not visible.

6. A computer program product, comprising a computer-readable, tangible storage device having a computer-readable program code stored therein, the computer-readable program code containing instructions that are carried out by a central processing unit (CPU) of a computer system to implement a method of visualizing versions of a hierarchically organized object, the object having labeled nodes and numerical parameters, the versions including a unique standard version, the method comprising the steps of:
computing a respective similarity measure between each version and the unique standard version;
clustering versions having identical hierarchies into respective sets of versions;
organizing versions within each of the respective sets of versions according to the computed respective similarity measures;
generating a visualization as a plot having first and second dimensions, wherein the first dimension represents similarity between a set of versions and the unique standard version, and wherein the second dimension represents similarity between a version and the unique standard version;
representing each version as a respective tree having labeled paths;
constructing a vector space having multiple dimensions for each labeled path of every tree, wherein the step of constructing the vector space includes constructing each vector in the vector space to have first and second parameters for each respective labeled path, wherein the first parameter indicates a duration for completing work associated with a service and a respective labeled path, wherein the second parameter indicates a cost of providing the work, and wherein the object is a document that indicates a proposal for a service provider to provide the service to a client;
generating a second visualization having first and second areas that include first and second versions, respectively, wherein the first and second versions each include information from multiple levels of the respective trees; and
generating the second visualization so that the second version in the second area includes a visual cue that highlights a value of a dimension for a labeled path of the respective tree representing the second version, wherein based on the constructed vector space, the highlighted value differs from a corresponding value of a dimension for a labeled path of the respective tree representing the first version, wherein the step of computing the respective similarity measure includes computing the respective similarity measure between the first and second versions by normalizing a first vector associated with the first version, normalizing a second vector associated with the second version, and determining a product of the normalized first vector and the normalized second vector based on the first parameter indicating the duration and the second parameter indicating the cost.

7. The program product of claim 6, wherein the step of computing the respective similarity measure includes calculating a respective cosine similarity between each version and the unique standard version.

8. The program product of claim 6, wherein the method comprises the step of retrieving historical approval delay times for versions whose similarity to a version satisfies a user-specified criterion, wherein the numerical parameters include a projected time to a decision about whether to approve the version and a projected likelihood of the decision indicating an approval of the version based on the retrieved historical approval delay times.

9. The program product of claim 6, wherein the method comprises the steps of:
representing each version as a respective tree having labeled paths;
constructing a vector space having multiple dimensions for each labeled path of every tree; and
generating a summary that lists one or more labeled paths, one or more respective dimensions and one or more respective differences, wherein each listed path includes a respective dimension whose values for a first version and a second version differ based on the constructed vector space, and wherein each listed respective difference indicates how much the values of the respective dimension for the first and second versions differ.

10. The program product of claim 6, wherein the step of generating the visualization includes generating the visualization in a scrollable map in which a first portion of the visualization is visible and a second portion of the visualization is not visible.

* * * * *